Figure 1:
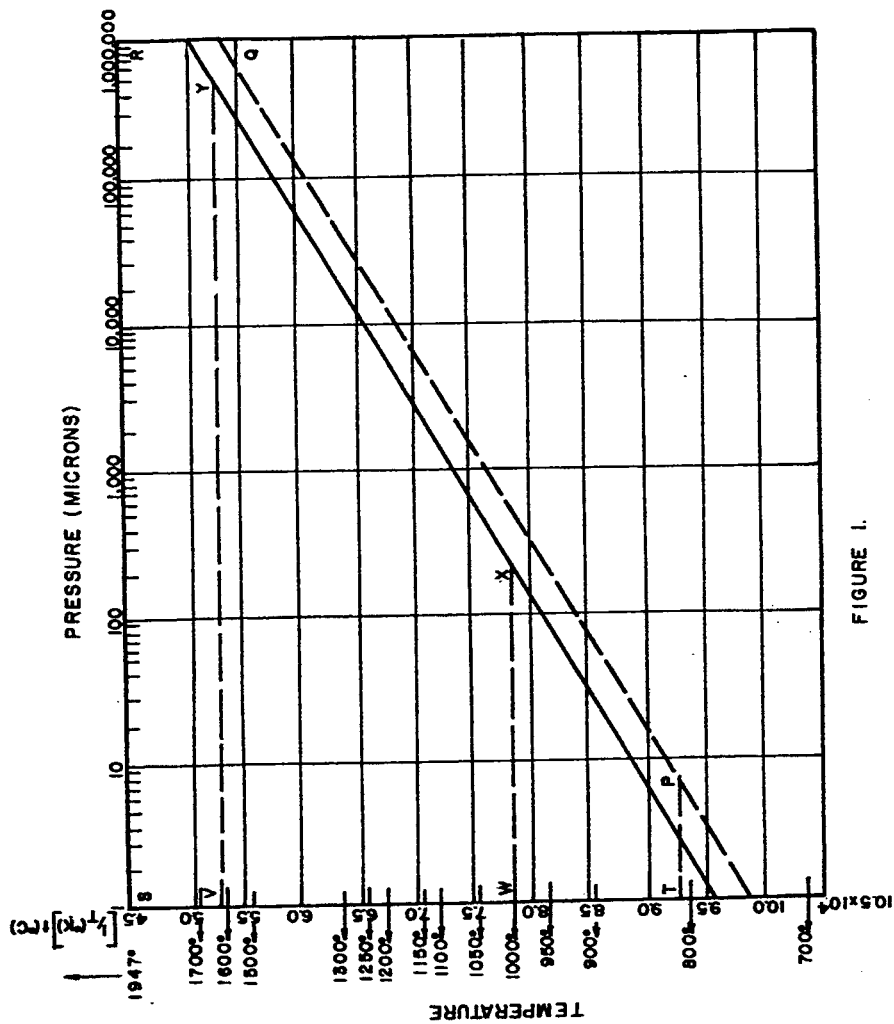

Sept. 1, 1964 D. E. HILL 3,147,413
POINT CONTACT RECTIFIER OF BORON PHOSPHIDE HAVING
BORON-TO-PHOSPHORUS ATOMIC
RATIO OF 6 TO 100
Filed Oct. 27, 1960 3 Sheets-Sheet 3

INVENTOR.
DALE E. HILL

United States Patent Office 3,147,413
Patented Sept. 1, 1964

3,147,413
POINT CONTACT RECTIFIER OF BORON PHOSPHIDE HAVING BORON - TO - PHOSPHORUS ATOMIC RATIO OF 6 TO 100
Dale E. Hill, Dayton, Ohio, assignor to Monsanto Company, a corporation of Delaware
Filed Oct. 27, 1960, Ser. No. 65,540
18 Claims. (Cl. 317—237)

This invention relates to inorganic point contact rectifier devices. More particularly, the invention contemplates the use of new crystalline rhombohedral boron phosphides having a boron-to-phosphorus atomic ratio of at least 6 to 1, as the semiconductor component in point contact rectifier devices, the preferred material being the compound $B_6P$. These components can suitably be in the form of discs, wafers, bars, rods, rectangular parallelepipeds, round or any other geometrical shape; however, preferred shapes are thin discs or plates.

It is an object of this invention to provide new and useful point contact rectifier devices which have high thermal stability and high rectification ratios.

This and other objects of the invention will become apparent as the detailed description of the invention proceeds.

It has now been discovered that the new boron phosphides of this invention, particularly, $B_6P$, are extremely satisfactory in the construction and use of point contact rectifying devices.

It has been found that boron phosphides having boron-to-phosphorus atomic ratios of at least 6 to 1 have chemical and physical properties which render them eminently suitable in semi-conductor devices having, for example, a markedly high thermal stability permitting high operating temperatures. Specifically, these boron phosphides have dissociation pressures of less than 100 microns of Hg at 1200° C. Consequently, these boron phosphides are suitably operable at temperatures up to about 2000° C. Compared against the new boron phosphides as a rectifier material are the well known semiconductor materials germanium, which can only be used at temperatures up to about 80° C., silicon which is operable at 200° C., or the compound BP which is operable at 1000° C.

Boron phosphides having a boron-phosphorus atomic ratio of at least 6 to 1 exhibit the usual negative temperature coefficient of resistance of a semiconductor, and have a forbidden energy gap of about 2.0 electron volts as compared with germanium with 0.7 electron volt and silicon with 1.12 electron volts.

The new crystalline rhombohedral boron phosphides of the present invention are extremely hard, thermally stable and chemically inert.

The novel forms of crystalline boron phosphide disclosed herein may be prepared by a chemical reaction between elemental boron and elemental phosphorus, by thermal decomposition of boron phosphide having the formula BP, by the reaction of elemental boron with BP, by reaction of elemental boron with the compound phosphine, $PH_3$, or by the reaction of a phosphorus source, such as ferrophosphorus or crude phosphate ore, with a boron source, such as elemental boron, crude borax, or other boron compound, in a molten inorganic matrix, such as molten metals or salts thereof.

While the above-described methods may be used to prepare any of the crystalline boron phosphides having a boron-to-phosphorus atomic ratio of at least 6 to 1, they are particularly useful for preparing the stoichiometric compound $B_6P$. However, a more preferred method for preparing higher boron phosphides, i.e., those having boron-to-phosphorus atomic ratios greater than 6 to 1, consists of heating the compound $B_6P$ under specific conditions set forth hereinafter. This method is preferred because it is susceptible to more accurate means of control for obtaining specific compositions within the above ratio than are the earlier named methods for obtaining the same compositions.

The following specific examples illustrate methods of preparation of the new crystalline boron phosphides under equilibrium conditions:

*Example 1*

The transformation of the simple form of boron phosphide having the formula, BP, to the crystalline form having the formula, $B_6P$, was conducted by placing 100 g. of boron phosphide in finely-divided form in a graphite crucible in a porcelain tube located in an electric furnace. The porcelain tube was connected to a vacuum system which could be maintained at 50 microns of Hg pressure. The electric furnace was brought up to a temperature of 1200° C. and maintained constant. It was found that the evolution of phosphorous during a 12 period yielded a residual product having the formula, $B_6P$. It was also found that the starting material could be either amorphous BP or the cubic crystalline form of boron phosphide with the production of the same ultimate product.

The critical consideration required for the transformation of BP to $B_6P$, is that the system be operated such that the partial pressure (phosphorous) be less than that of the decomposition pressure of BP at the ambient temperature.

In the present example the operating pressure of the furnace and the temperature at which it is maintained were such that the transformation of BP to $B_6P$ was aided by permitting the evolved phosphorous resulting from the dissociation to be removed from the reaction zone (by means of the vacuum collection system). The temperature in the phosphorous collection zone was maintained at a relatively low value by the use of a water condenser, e.g., pressure of the phosphorous source which was less lower than the dissociation pressure (phosphorous) over the product, thus allowing the desired reaction to proceed.

After the processing described above, the product having the formula, $B_6P$, was found to be a gray powder of unusual hardness. It was found that the gray powder was harder than silicon carbide, and had a hardness on the Moh scale between 9.0 and 9.7.

X-ray diffraction analysis also detected the existence of a unique crystalline structure for the above sample different from that of the compound BP.

*Example 2*

The reaction of elemental boron with elemental phosphorous for the production of hexaboron phosphide, $B_6P$ was carried out by charging 0.4176 g. of amorphous boron into a graphite crucible which had been prepared by drilling a ⁵⁄₁₆″ hole in a cylindrical piece of ½″ graphite rod. The charged crucible was placed into a ¾″ outside diameter ceramic tube 10″ long, closed at the end nearest the sample. One-half of this ceramic tube was located in a high temperature furnace while the other end was placed in an adjacent low temperature furnace, without any cold zone between the two furnaces.

The other end of the ceramic tube was then charged with 1.976 g. of amorphous red phosphorous, after which the tube was evacuated and sealed.

The tube was located in the two adjacent furnaces which were then gradually brought up to the desired temperature. The hot zone was maintained at a temperature of 1100° C., while the temperature of the phosphorous end was maintained at 111° C. to volatilize the phosphorous and to maintain a phosphorous partial pressure of about 1000 microns of Hg.

The heating of the reaction system caused phosphorus to vaporize with the result that the phosphorus vapor filled the entire tube at the desired pressure. The phosphorus vapor then reacted with the hot boron contained at the other end of the tube. It was found that at the end of a heating period of about 24 hours, the boron had been transformed substantially completely to the compound hexaboron phosphide. A similar experiment conducted at 1200° C. was also found to give the substantially quantitative yield of hexaboron phosphide. In general, the operating pressure which yields the desired hexaboron phosphide instead of boron phosphide is in the range of 100 to 1500 microns of Hg at temperatures between 1000° C. and 1200° C. Thus, as shown in FIG. 1, at 1000° C., the pressure of 100 microns of Hg gives hexaboron phosphide while a pressure of 1570 microns of Hg gives boron phosphide.

In the present example the use of the shaped charge of starting material, i.e., boron located in the drilled cavity in the graphite crucible resulted in the production of a similar and identically shaped product of hexaboron phosphide. This shaped article was found to be stable at high temperatures.

The hexaboron phosphide product was found to have a bulk density of 2.45. However, the ultimate density of individual homogenous particles varies between 2.60 and 2.72. In contrast, cubic crystalline boron phosphide has a theoretical X-ray density of 2.97.

In this example, as in the preceding example, the condition of the formation of hexaboron phosphide is that the system be operated such that the partial pressure (phosphorus) is less than that of the decomposition pressure of boron phosphide at the ambient temperature.

The higher boron phosphides, i.e., those having boron-phosphorus atomic ratios greater than 6 to 1, are also prepared in accordance with this method, for example; by adding to 67.65 gms. of elemental boron sufficient elemental phosphorus to form the desired higher boron phosphide. For example, 9.6 gms. of phosphorus reacted with 67.65 gms. of boron produces $B_{20}P$, 4.84 gms. of phosphorus produces $B_{40}P$, 2.76 gms. produces $B_{70}P$ and 1.94 gms. of phosphorus produces $B_{100}P$.

Example 3

The production of the compound $B_6P$ from boron phosphide reacted with excess elemental boron, was carried out at a series of temperatures above 1000° C. Boron phosphide was employed as a finely-divided crystalline powder, while the boron was also in a finely-divided form of less than 100 mesh particle size.

The two components were mixed and charged to a graphite crucible having an internal and external element which fitted loosely together with the space between the two portions forming a nose cone such as was adaptable for use in a rocket. The intimately mixed combination of boron phosphide and elemental boron (5 moles of boron per mole of boron phosphide) was heated to a temperature of 1300° C. for a period of 18 hours in an inert gas atmosphere. At the end of this time the charged crucible was cooled and the test piece removed. It was found that the boron phosphide had been transformed substantially completely to crystalline $B_6P$ product which was very hard and which could be subjected to oxidizing or reducing flames without substantial deterioration.

This same procedure is followed to obtain the higher boron phosphides by increasing proportionately the amount of elemental boron required to react with BP to produce the desired boron-phosphorus ratio.

Example 4

The formation of $B_6P$ by the reaction of boron trichloride, $BCl_3$, as the boron source with hydrogen and elemental phosphorus as the phosphorus source was carried out by introducing the respective zones into a reactor from the respective gas phases. The elemental phosphorus was provided by bubbling a stream of hydrogen through a heated pool of phosphorus, yellow form. The gas heated with the phosphorus was directed into a heated reaction vessel, into which gaseous boron trichloride was also flowing. At temperatures of 1100° C. the reaction between the $BCl_3$ and the phosphorus results in the formation of the crystalline product $B_6P$. However, it is essential that the conditions be such that the partial pressure (phosphorus) be less than that of the decomposition pressure of boron phosphide at the ambient temperature.

This same procedure is followed to obtain the higher boron phosphides by increasing proportionately the amount of boron trichloride required to supply free boron sufficient to react with elemental phosphorus to obtain the desired boron-phosphorus ratio.

Example 5

The production of $B_6P$ by the reaction of elemental boron as the boron source in solid form with phosphine, $PH_3$, as the phosphorus source supplied in a gas form was conducted in a ceramic tube located in an electric furnace. A 10 g. sample of elemental boron held in the furnace for a period of 12 hours with the continuous passage of phosphine over the boron was found to result in a substantially complete transformation to $B_6P$. The necessary condition for the reaction was that the partial pressure (phosphorus) be less than that of the decomposition pressure of boron phosphide at the ambient temperature.

The higher boron phosphides are similarly prepared by adjusting upwardly the proportion of elemental boron to phosphine required to produce the desired higher boron-phosphorus ratio.

This method was also found to yield the desired boron phosphide by the reaction of the said elemental solid form of boron with elemental phosphorus carried in an inert gas flame, preferably hydrogen, although argon or nitrogen can also be used.

Example 6

The formation of hexaboron phosphide, $B_6P$, in an inorganic melt was carried out by the reaction of crystalline BP with a 10 molar excess of elemental boron. This reaction was carried out in a ferro-melt by first forming BP from ferro-boron and ferrophosphorus. This resulted in the production of a finely dispersed form of BP in the molten iron matrix. The 10 molar excess of elemental boron was then stirred into the molten reaction medium. This was maintained at a temperature of 1400° C. for a period of 24 hours. At the end of this time the reaction mass was cooled, after which the iron content was removed by solution in sulfuric acid. The residual, insoluble sludge was then washed, treated with hydrofluoric acid and the crystalline form of $B_6P$ recovered as the ultimate product. The criterion for the formation of $B_6P$ is that the system be operated such that the partial pressure (phosphorus) be less than that of the decomposition pressure of boron phosphide at ambient temperatures greater than 800° C. throughout the entire process.

FIG. 1 shows the equilibrium process operating region which has been found to yield the preferred product $B_6P$. This is the range of phosphorus pressure below the line PQR (area PQRST where R and Q are intercepts on the 1,000,000 micron of Hg pressure line) and preferably below the line XY (area VWXY). The lower limit of this operating range is the pressure one micron of Hg. The broader operating temperature range is, as shown in FIG. 1, from 800° C. to 1947° C., the preferred range being from 1000° C. to 1600° C. The pressure range is from 1 to one million microns of Hg, the preferred range being represented by the line XY.

While the above examples describe the preparation of the desired crystalline boron phosphide, it will be noted that FIG. 1 represents equilibrium conditions for producing $B_6P$. Higher crystalline boron phosphides, i.e., those having boron-to-phosphorus atomic ratios greater than 6 to 1 may also be prepared under similar non-equilibrium conditions at temperatures between 800° C.

and 2100° C. and pressure of 1 micron of Hg to 100 atmospheres. However, a more preferred method for obtaining the higher boron phosphides consists in heating the compound hexaboron phosphide $B_6P$ under specific conditions set forth hereinafter. This method is preferred because it is susceptible of more accurate means of control for obtaining specific higher boron phosphide compositions than are the earlier discussed methods.

The preferred procedure for obtaining higher boron phosphides is based upon the fact that when hexaboron phosphide is heated within a temperature range of from 800° C. to 2100° C. and within a pressure range of from 1 micron of Hg to 100 atmospheres it undergoes a progressive weight loss due to evolution of phosphorus until the desired crystalline boron phosphide is obtained as determined by a continuous measurement of the hexaboron phosphide sample. For each boron phosphide there is a definite weight loss value. When the sample has lost a specific weight, the $B/P$ ratio for that weight loss represents the composition of the resultant boron phosphide.

There are several methods available for continuously measuring the weight loss of the sample, the more common ones being by use of a quartz spring balance, in conjunction with a cathetometer, a simple spring balance or a strain gauge. These devices are commercially available.

As a variation of this procedure one may substitute for the $B_6P$ sample, any other higher boron phosphide and thermally treat it to obtain a still higher boron phosphide.

The instant boron phosphides, e.g., $B_6P$ can be doped with various materials to produce the desired n- or p-type semiconductor. Doping is known in this art as adding small amounts of foreign materials to change the degree and/or type of a semiconductor material. The treating or doping agent treatment used is a method of controlling the degree of electronic (or positive hole) conduction in $B_6P$. The degree of conduction varies with the amount and type of doping agent used. For example, if it is desired, during the process of producing $B_6P$ by any of the above methods, a volatile halide of a Group II–B element, i.e., zinc, cadmium or mercury, magnesium or beryllium can be added to the reactants in minor amounts to give p-type $B_6P$. If an n-type $B_6P$ is desired the Group VI–B element i.e., oxygen, sulfur, selenium, tellurium or polonium, can be added during the process in trace amounts. In practice, during the process of making the $B_6P$, whether doping agents are added are not, sufficient impurities will normally be picked up by the $B_6P$ being formed to make it either n- or p-type. Doping of the boron phosphide, $B_6P$, for example, of course, can be done after the formation of the crystal by diffusion of the doping agents into the crystalline structure at elevated temperatures, but normally it is preferred to do the doping during the manufacture of the higher boron phosphide.

Doping crystalline boron phosphides, after the formation of the crystal, can be carried out as follows: the higher boron phosphide is heated to a temperature of about 1100° C. and subjected to a trace amount of the vaporized doping element which is allowed to diffuse into the higher boron phosphide crystal. Normally, long periods of time will be required for this type of doping procedure, possibly several days. When it is determined that sufficient doping material has diffused throughout the boron phosphide, the crystal is rapidly quenched reducing the temperature to room temperature. This of course, is the conventional diffusion and quench method used for doping semiconductor materials after the crystalline material has been made. If the material is cooled slowly, rather than being quenched rapidly, the doping agent will diffuse right out of the lattice again. Quenching traps the doping agent within the crystal.

The following example illustrates a specific embodiment of point contact rectification experiments carried out using a disc of hexaboron phosphide, $B_6P$.

*Example 7*

A disc of hexaboron phosphide, $B_6P$, was hot pressed to dimensions of 0.19" x 0.12" x 0.33". This disc was coated on the bottom side with silver paint (suitably other noble metal paint can be used) to provide good ohmic contact with the disc for attachment of an electrode. The disc was placed on top of the gold-plated nickel plate, providing good ohmic contact between the silver-coated side of the disc and the gold-plated nickel plate. The point contact electrode for the apparatus was a pointed phosphor-bronze (tungsten or other suitable substance may be used here). The pointed wire was brought to bear on the uncoated top of the $B_6P$ with a force of 50 g. Electrical leads were attached to the point contact electrode and to the gold-plated nickel plate. With the electrical leads the variable direct current battery source was connected to the rectifier. Various voltages were applied to the rectifier and the current of these voltages was measured. The rectification ratio of 100 to 1 was found and the rectifier was found to withstand a back voltage of 20 volts without breakdown.

As an alternative, but less preferred embodiment of the present invention, the same procedure recited in Example 7 may be followed wherein the conducting surface of silver paint is omitted and the electrode 4 is fused, soldered or welded directly to disc 2.

When Example 7 is repeated using other higher boron phosphides of this invention, comparable rectification ratios and back-voltage resistances are obtained.

Figure 2:
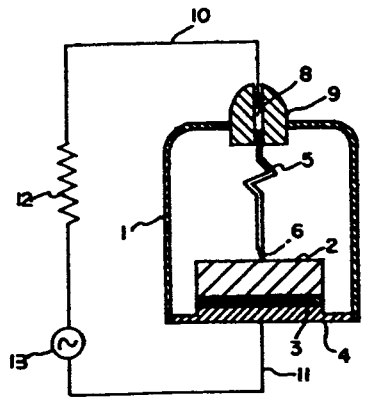

The invention will be more clearly understood from the following detailed description of the invention made with reference to the accompanying drawing FIG. 2 which is a schematic view of the point contact rectifier; 1 is a glass capsule enclosing the rectifying elements. Body 2, in the shape of a disc, is one of the new crystalline boron phosphide materials e.g., $B_6P$. For optimum rectifying properties disc 2 should be not more than about 40 mils thick preferably not more than about 10 mils thick. The bottom side of disc 2 is coated with the silver paint film 3 to make ohmic contact therewith and provide a conducting surface for soldering or welding to the disc electrode 4 which is suitably a nickel electrode. A suitable solder for soldering electrode 14 to the silvered bottom surface of body 2 is a lead-tin eutectic alloy having some cadmium therein. These alloys are commercially available. The upper surface of body 2 is uncoated and spring wire point contact electrode 5, suitable phosphor-bronze or a tungsten whisker, is pressed against the upper surface of disc 2 to make rectifying contact therewith. Suitably a force of about 50 g. is used; however, this force can vary from about 10 to about 100 g. more or less, for optimum performance. The upper end of point contact wire 5 is welded, soldered or otherwise integrally connected to electrode 8 which suitably is nickel. Electrode 8 is encased in insulated lead-through 9 which suitably is ceramic, quartz or the like. Glass capsule 1 is connected to the insulated lead-through 9 and metal base electrode 4 in such manner as to encapsulate the rectifying elements. Such an arrangement as this allows the maintenance of any desired type of atmosphere around disc 2, including high vacuum, if desired. It is very easy to provide an opening in the glass capsule to provide the desired atmosphere inside and seal off the opening in the glass to maintain this desired atmosphere. Electrical leads 10 and 11 are connected to electrodes 8 and 4 respectively, and to an alternating current source 13 to be rectified and an electrical load 12. Suitably the direct current voltage resulting from the rectified current flowing in the system will appear across resistor 12. Suitably, alternating current source 13 can be a 110 volt, 60 cycle source of other alternating current source of higher or lower voltage.

Figure 3:
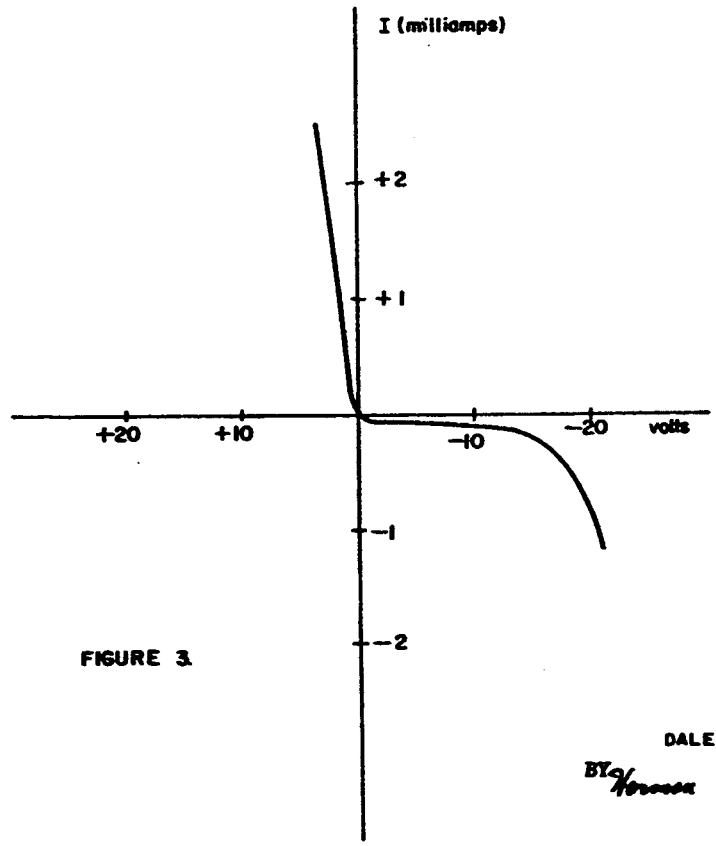

FIG. 3 is a graph of the data obtained, being a plot of the voltages in volts against the current flowing in the rectifier in milliamperes and indicates a rectification ratio of about 100 to 1 and a back voltage of about 20 volts without breakdown.

The thermal stability of the group of boron phosphides having boron-to-phosphorus ratios of at least 6 to 1 is a characteristic property which readily distinguishes this boron-rich group from the elementary boron phosphide, BP. At temperatures above 1000° C., BP evolves phosphorus copiously resulting in a deleterious atmosphere of phosphorus on and around the components of the rectifier device which is corrosively destructive of the operation thereof. Coincidental with this evolution of phosphorous is a breakdown of the physical structure of the BP component due to a collapse of its cubic crystalline structure. On the other hand, the boron phosphides described herein are not cubic crystalline in form, hence, even when phosphorus is lost, at much higher temperatures than 1000° C., there is no physical breakdown of the rectifier component. And, since the phosphorus content of the instant boron phosphides is much lower than in BP, there is less phosphorus to evolve into a deleterious atmosphere thereof around the components of the rectifier device. As a consequence, the boron phosphides described and claimed herein are far superior to BP, being operable at higher temperatures for longer periods of time with less danger of corrosion of the rectifier components.

As an illustration of the comparative thermal stability of the compounds BP and $B_6P$ (representative of the new class of boron phosphides), when BP is heated to a temperature of 1100° C. at 100 microns of Hg pressure, it immediately begins to evolve phosphorus and to decompose until after about 40 hours the BP is transformed completely to $B_6P$. At 1200° C. and 100 microns of Hg pressure, BP decomposes still more rapidly until after only about 3 hours it is transformed completely to $B_6P$. On the other hand, $B_6P$ is thermally stable at 1200° C. and 100 microns of Hg pressure.

Figure 4:
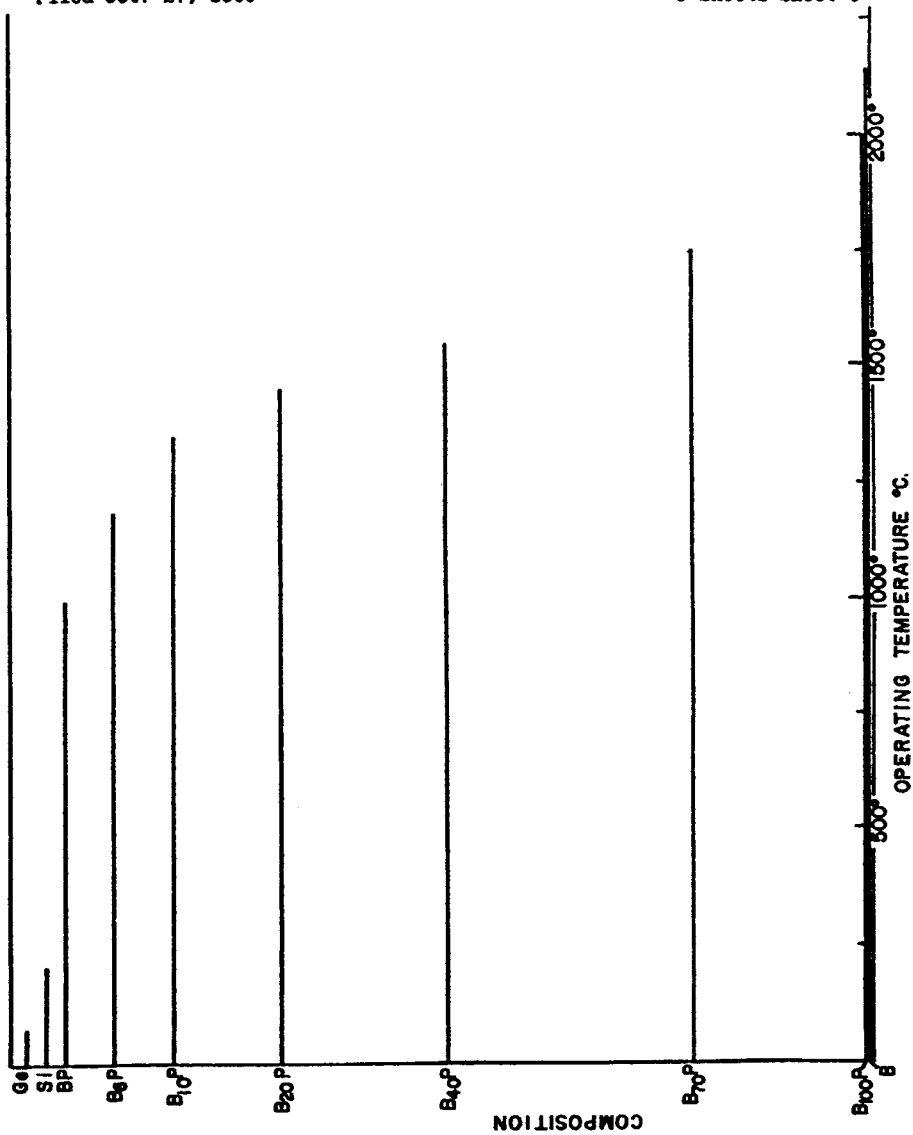

FIG. 4 is a graph showing the approximate operating temperatures of various elements and boron phosphide compounds and compositions in semi-conductor applications. It is apparent that the new crystalline boron phosphides of the present invention, having a boron-to-phosphorus atomic ratio of at least 6 to 1 are operable at temperatures far exceeding prior art materials.

It will be apparent to those skilled in the art that suitable equivalent materials may be substituted for the various non-boron phosphide components in the rectifier of this invention. For example, whereas in the specific embodiment described herein silver paint was used to make ohmic contact between the boron phosphide disc and electrode 4, other suitable metals can be used; also, other materials than gold-plated nickel can be used as the electrode in contact with the silver paint or the nickel electrode connecting the phosphor-bronze or tungsten wire to the upper side of the boron phosphide disc. The spring wire point contact electrode itself may be another suitable material. The same applies to the glass capsule and ceramic lead-through.

It will be understood by those skilled in the art that the foregoing description of the invention in terms of a specified apparatus is by way of illustration only and that the invention is not necessarily limited thereto in view of equivalent alternative embodiments apparent to those skilled in the art. Accordingly, modifications are contemplated which can be made without departing from the spirit and scope of the described invention.

Other metals which are effective to provide ohmic contacts with the boron phosphides are platinum and its alloys, such as platinum-rhodium.

What is claimed is:

1. A point contact rectifier device comprising a boron phosphide body having a boron-to-phosphorus atomic ratio within the range of from 6 to 1 to 100 to 1, an electrode making ohmic contact therewith and a point contact electrode in contact with said body.

2. A point contact rectifier device comprising a boron phosphide body having a boron-to-phosphorus atomic ratio within the range of from 6 to 1 to 100 to 1, a conducting element on a portion of said body to facilitate electrical connection thereto, an electrode making ohmic contact with said body through said conducting element and a point contact electrode in contact with said body.

3. Device of claim 1 wherein said body is in the form of a disc.

4. Device of claim 1 wherein the point contact electrode is a Phosphor bronze wire.

5. Device of claim 1 wherein the point contact electrode is a tungsten wire.

6. Device of claim 2 wherein the conducting surface is a silver paint film.

7. Device of claim 1 wherein the said body is the boron phosphide $B_6P$.

8. Device of claim 1 wherein the said body is the boron phosphide $B_{20}P$.

9. Device of claim 1 wherein the said body is the boron phosphide $B_{40}P$.

10. Device of claim 1 wherein the said body is the boron phosphide $B_{70}P$.

11. Device of claim 1 wherein the said body is the boron phosphide $B_{100}P$.

12. A point contact rectifier device comprising a boron phosphide disc, said boron phosphide having a boron-to-phosphorus atomic ratio within the range of from 6 to 1 to 100 to 1, said disc being coated on one side with a conducting surface, a first metal electrode attached to the conducting surface of said disc and making ohmic contact therewith, a point contact electrode making rectifying contact with the uncoated side of said disc, the other end of said point contact electrode being attached to a second metal electrode which is encased in a non-conducting lead-through, a capsule enclosing said disc and electrodes, and being attached to said lead-through and to said first metal electrode.

13. The device of claim 12 wherein the first metal electrode is noble metal-plated, the conducting surface is a noble metal conducting surface and the point contact electrode is Phosphor bronze.

14. Device of claim 12 wherein said disc is the boron phosphide $B_6P$.

15. Device of claim 12 wherein said disc is the boron phosphide $B_{20}P$.

16. Device of claim 12 wherein said disc is the boron phosphide $B_{40}P$.

17. Device of claim 12 wherein said disc is the boron phosphide $B_{70}P$.

18. Device of claim 12 wherein said disc is the boron phosphide $B_{100}P$.

References Cited in the file of this patent

UNITED STATES PATENTS

| | | |
|---|---|---|
| 2,908,851 | Millea et al. | Oct. 13, 1959 |
| 2,939,058 | Masterson | May 31, 1960 |
| 2,980,833 | Epstein | Apr. 18, 1961 |

FOREIGN PATENTS

| | | |
|---|---|---|
| 719,873 | Great Britain | Dec. 8, 1954 |